US012699043B2

(12) United States Patent
Jullien et al.

(10) Patent No.: US 12,699,043 B2
(45) Date of Patent: Aug. 4, 2026

(54) METHOD AND APPARATUS FOR DETECTING A PHOTOCHEMICALLY ACTIVE CHEMICAL SPECIES IN A SAMPLE

(71) Applicants: CENTRE NATIONAL DE LA RECHERCHE SCIENTIFIQUE, Paris (FR); ECOLE NORMALE SUPERIEURE DE PARIS, Paris (FR); SORBONNE UNIVERSITE, Paris (FR)

(72) Inventors: Ludovic Jullien, Paris (FR); Raja Chouket, Paris (FR); Agathe Espagne, Paris (FR); Annie Lemarchand, Paris (FR); Thomas Le Saux, Paris (FR); Agnès Pellissier-Tanon, Paris (FR)

(73) Assignees: CENTRE NATIONAL DE LA RECHERCHE SCIENTIFIQUE, Paris (FR); ECOLE NORMALE SUPERIEURE DE PARIS, Paris (FR); SORBONNE UNIVERSITE, Paris (FR)

( * ) Notice: Subject to any disclaimer, the term of this patent is extended or adjusted under 35 U.S.C. 154(b) by 1175 days.

(21) Appl. No.: 17/642,213

(22) PCT Filed: Jul. 31, 2020

(86) PCT No.: PCT/EP2020/071687
§ 371 (c)(1),
(2) Date: Mar. 10, 2022

(87) PCT Pub. No.: WO2021/052668
PCT Pub. Date: Mar. 25, 2021

(65) Prior Publication Data
US 2022/0334051 A1      Oct. 20, 2022

(30) Foreign Application Priority Data
Sep. 18, 2019    (EP) ..................................... 19306120

(51) Int. Cl.
G01N 21/27 (2006.01)
G01N 21/64 (2006.01)

(52) U.S. Cl.
CPC ....... G01N 21/272 (2013.01); G01N 21/6408 (2013.01)

(58) Field of Classification Search
CPC ........... G01N 21/6428; G01N 21/6408; G01N 21/272
See application file for complete search history.

(56) References Cited

U.S. PATENT DOCUMENTS 6,049,380 A     4/2000  Goodwin et al.
6,563,585 B1 *  5/2003  Rao ...................... G01N 21/645
                                                  356/417
(Continued)

FOREIGN PATENT DOCUMENTS

JP      2011521250 A     7/2011
JP      2017535764 A     11/2017
(Continued)

OTHER PUBLICATIONS

Valm, et al., "Applying systems-level spectral imaging and analysis to reveal the organelle interactome", Nature, vol. 546, pp. 162-167, 2017.
(Continued)

*Primary Examiner* — Shogo Sasaki
(74) *Attorney, Agent, or Firm* — HAUPTMAN HAM, LLP

(57) ABSTRACT
A method for detecting a photochemically active chemical species in a sample, comprising the steps of: a) illuminating the sample with light at a wavelength suitable to trigger a reaction affecting an optical property of the chemical species according to an illumination sequence, such that: •in at least a first time window, the kinetics of the first reaction is
(Continued)

limited by a photochemically-activated step of the reaction; •and in at least a second time window, the kinetics of the first reaction is limited by a thermally-activated step; b) measuring the evolution of the optical property during the first and the second time windows; c) determining at least a first and a second time constant representing the kinetics of the first reaction in the first and the second time windows, respectively; and d) using the determined time constants for identifying the chemical species. An apparatus for carrying out such a method.

15 Claims, 9 Drawing Sheets

(56)                  References Cited

U.S. PATENT DOCUMENTS

| | | | | |
|---|---|---|---|---|
| 2004/0051051 A1* | 3/2004 | Kato | .................. | G01N 21/6452 |
| | | | | 250/458.1 |
| 2008/0117418 A1* | 5/2008 | Claps | ................. | G01N 21/6408 |
| | | | | 356/318 |
| 2009/0040518 A1 | 2/2009 | Widengren | | |
| 2009/0095911 A1* | 4/2009 | Kim | ................... | G01N 21/6408 |
| | | | | 250/363.01 |
| 2009/0164130 A1* | 6/2009 | Kumar | ............... | G01N 21/6408 |
| | | | | 702/19 |
| 2009/0173892 A1 | 7/2009 | Courtney et al. | | |
| 2012/0049086 A1* | 3/2012 | Sakai | ................... | G01N 21/274 |
| | | | | 250/459.1 |
| 2012/0283531 A1* | 11/2012 | Maynard | .............. | A61B 5/0071 |
| | | | | 600/316 |
| 2016/0356716 A1* | 12/2016 | Jullien | ............... | G01N 33/5306 |
| 2017/0038299 A1 | 2/2017 | Long et al. | | |
| 2019/0212268 A1* | 7/2019 | Querard | ............. | G01N 21/6458 |

FOREIGN PATENT DOCUMENTS

| | | |
|---|---|---|
| JP | 2018513352 A | 5/2018 |
| JP | 2019517006 A | 6/2019 |
| WO | 9912018 A1 | 3/1999 |
| WO | 2009141410 A1 | 11/2009 |
| WO | 2015/075209 A1 | 5/2015 |
| WO | 2016057923 A1 | 4/2016 |
| WO | 2016127158 A1 | 8/2016 |
| WO | 2017173315 A1 | 10/2017 |
| WO | 2018/041588 A1 | 3/2018 |

OTHER PUBLICATIONS

Lakowicz, et al., "Fluorescence lifetime imaging", Anal. Biochem., vol. 202, pp. 316-330, 1992.

Marriott, et al., "Optical lock-in detection imaging microscopy for contrast enhanced imaging in living cells", Proc. Natl. Acad. Sci., vol. 105, No. 46, pp. 17789-17794, 2008.

Richards, et al., "Synchronously amplified fluorescence image recovery (SAFIRe)", J. Phys. Chem. B, vol. 114, No. 1, pp. 660-665, 2010.

Querard, et al., "Photoswitching kinetics and phase-sensitive detection add discriminative dimensions for selective fluorescence imaging", Angew. Chem. Int. Ed., vol. 54, pp. 2633-2637, 2015.

Querard, et al., "Resonant out-of-phase fluorescence microscopy and remote imaging overcome spectral imitations", Nat. Comm., vol. 8:969, 2017.

Summers, et al., "Systems of first-order chemical reactions", Mathl. Comput. Modelling, vol. 10, No. 12, pp. 901-909, 1988.

Istratov, et al., "Exponential analysis in physical phenomena", Rev. Sci. Instrum., vol. 70, pp. 1233-1257, 1999.

Widengren, "Fluorescence-based transient state monitoring for biomolecular spectroscopy and imaging", J. R. Soc. Interface, vol. 7, pp. 1135-1144, 2010.

Byrdin, et al., "A long-lived triplet state is the entrance gateway to oxidative photochemistry in green fluorescent proteins", Journal of the American Chemical Society, vol. 140(8), pp. 2897-2905, 2018.

Stiel, et al., "High-contrast imaging of reversibly switchable fluorescent proteins via temporally unmixed multispectral optoacoustic tomography", Optics Letters, vol. 40, No. 3, pp. 367-370. Feb. 1, 2015.

Querard, et al., "Kinetics of Reactive Modules Adds Discriminative Dimensions for Selective Cell Imaging", Chemphyschem, vol. 17, No. 10, pp. 1396-1413, May 18, 2016.

* cited by examiner

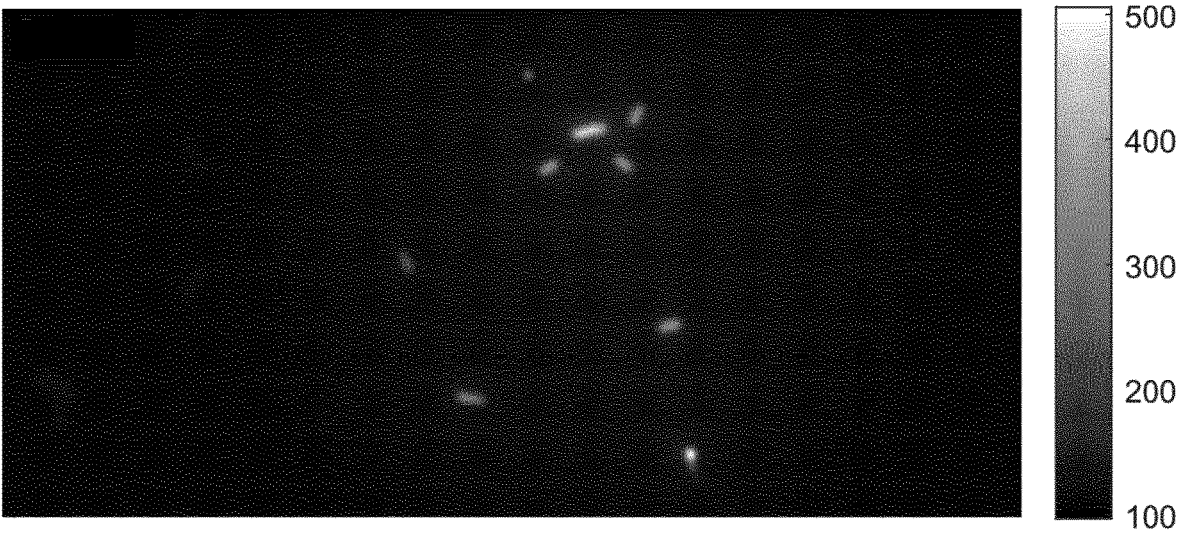
Fig. 11A
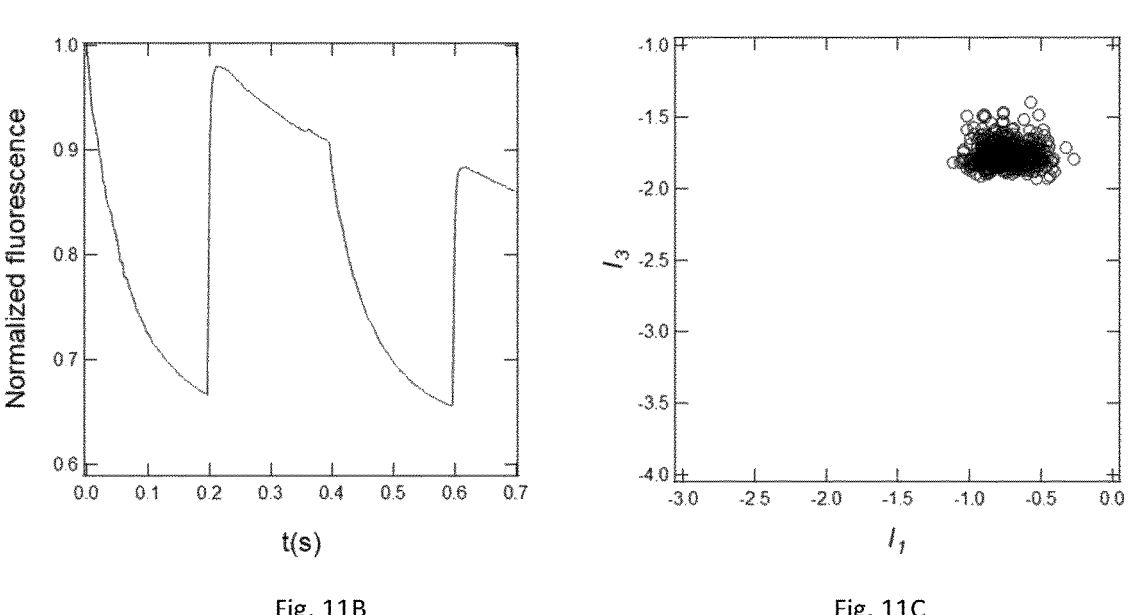
Fig. 11B
Fig. 11C

METHOD AND APPARATUS FOR DETECTING A PHOTOCHEMICALLY ACTIVE CHEMICAL SPECIES IN A SAMPLE

CROSS-REFERENCE TO RELATED APPLICATIONS

This application is a National Stage of International patent application PCT/EP2020/071687, filed on Jul. 31, 2020, which claims priority to foreign European patent application No. EP 19306120.7, filed on Sep. 18, 2019, the disclosures of which are incorporated by reference in their entirety.

The invention relates to a method for detecting a photochemically active chemical species—e.g. a fluorescent protein (FP) or a reversibly photoswitchable fluorescent protein (RSFP)—in a sample, and more particularly for identifying it by discriminating it between several photochemically active chemical species present, or suitable to be present, in the sample. The inventive method also lends itself to different other applications, such as localizing a photochemically active chemical species in an observed region, provided that a suitable inhomogeneous illumination is used, and determining the specific chemical and physical environment of a detected photochemically active chemical species.

Such a method applies, in particular, to the fields of fluorescence microscopy and biological/biochemical analysis.

The invention also relates to an apparatus for carrying out such a method.

The term "chemical species" is understood to mean a molecule, a molecular ion or a complex. Within the framework of the invention, a chemical species is defined by its—notably photochemical—properties. Therefore, a same molecule, molecular ion or complex in a different environment affecting these properties may be considered as a different species.

A "photochemically active" species is a chemical species which undergoes a change of electronic configuration and/or chemical structure under the effects of light.

The expression "reversibly photoswitchable" is understood to mean a chemical species (typically a protein) that has at least two distinct states having different properties (e.g. fluorescence properties) and that may be made to pass from one state to the other reversibly under the effect of light. Examples of reversibly photoswitchable species are "Dronpa" and the complex "Spinach-DFHBI" ("Spinach" being an RNA aptamer and DFHPI a fluorogenic probe). These species may in particular be used as labels or markers.

Fluorescence imaging, and particularly fluorescence microscopy, has become essential for biology in view of the high sensitivity and versatility of fluorescent labels. The common approach to identify and discriminate fluorescent labels is to read out the fluorescence signal in the spectral domain. Yet spectral discrimination exhibits limitations for highly multiplexed observations. Even with a rich hardware of light sources, optics corrected for chromatic aberration, dichroic mirrors, optical filters, etc., spectral analysis of overlapping absorption and emission bands can routinely discriminate a maximum of four labels. State-of-the art spectral unmixing brings this number to six, five of which are genetically encoded ([Valm 2017]) but at significant cost in terms of photon budget and computation time. This severely limits the discriminative power of emerging genetic engineering strategies.

Since the optimization of fluorophores (cross section for light absorption, quantum yield of luminescence, half-width of absorption/emission bands) has essentially reached its physical limits and fluorescence should remain a much favored observable for imaging live cells, it is highly desirable to complement the spectral dimension by one or more additional dimensions for further discriminating fluorophores. And indeed several techniques have been developed to discriminate fluorophores using dynamical—i.e. temporal—information characterizing their absorption-fluorescence emission photocycles.

For instance, in Fluorescence Lifetime Imaging Microscopy (FLIM), the lifetimes of excited states have been exploited to distinguish fluorophores ([Lakowicz 1992]). However, beyond requiring sophisticated instruments and fast electronics, this technique is limited by the narrow lifetime dispersion (over less than an order of magnitude) of the bright fluorophores currently used in fluorescence imaging. Hence multiplexed fluorescence lifetime imaging has necessitated deconvolutions (which take time) or the adoption of subtractive schemes (which lack robustness and decrease the signal-to-noise ratio).

Reversibly photoswitchable fluorophores (RSFs—of which RSFPs are a subclass) do not suffer from this drawback. These labels benefit from a rich photochemistry, which goes much beyond the absorption-fluorescence emission photocycle. In RSFs, illumination drives several photocycles including photochemical and thermal steps, which intervene over a wide palette of relaxation times ($\mu$s to s) so as to facilitate discrimination at timescales compatible with real time observations of biological phenomena. Hence several protocols such as OLID, SAFIRe and OPIOM have exploited the time response of the fluorescence to light variations for imaging spectrally similar RSFs ("dynamic contrast") by relying on neither deconvolution nor subtraction schemes.

OLID, the acronym for "Optical Lock-In Detection", is described in [Marriott 2008].One drawback with this technique is that it does not provide quantitative information on the concentration of the RSF. Also, it requires at least one reference pixel.

SAFIRe, the acronym for "Synchronously Amplified Fluorescence Image Recovery", is described in [Richards 2010].The optimization of the dynamic contrast has the drawback of being done empirically, which introduces an additional implementation complexity.

TRAST is the acronym for TRAnsient STate imaging microscopy. It is described in [Widengren 2010].

OPIOM is the acronym for "Out-of-Phase Imaging after Optical Modulation". This method is described in [Querard 2015] and in WO 2015075209. In this method, a sample containing a RSF is illuminated with a periodically modulated light wave. The component of the intensity emitted by the fluorophores at the same angular frequency is then detected, in phase quadrature with respect to the excitation wave. Speed OPIOM ([Querard 2017] and WO2018/041588) is a variant of OPIOM which achieves shorter acquisition times thanks to the use of two-wavelength illumination.

Yet, all these protocols still miss the growing demand of quantitative biology to simultaneously image tens of chemical species in a cell or nearby cells within a tissue. For instance, Speed OPIOM has allowed independently imaging three spectrally similar RSFPs at an acquisition frequency of the order of one Hz. The other methods have even lower demonstrated discriminating power.

US 2009/0040518 describes a method for determining a plurality of kinetic rates from a set of time-integrated fluorescence measurements corresponding to different illumination conditions. This method has the drawback of being model-dependent.

The invention aims at overcoming, in whole or in part, these limitations of the prior art. More particularly it aims at improving the multiplexing capabilities in fluorescence imaging (and more broadly, in optical detection of chemical species) compared to other techniques exploiting dynamic contrast. Even more particularly, it aims at doing so without relying on deconvolution or substraction processing.

An idea at the basis of the invention consists in using labels experiencing different reversible fluorescence evolutions upon applying suitable alterations of illumination, which allows exploiting a plurality of relaxation times for dynamic contrast.

Indeed, according to the prior art, to enable their reliable discrimination without neither subtraction nor deconvolution based on dynamical contrast, two fluorescent labels must typically exhibit relaxation times of their signal differing by a factor of ten. This constraint means that to distinguish N labels, their dynamics should be spread over a $10^N \times \Sigma_{min}$-wide time window, where $\tau_{min}$ designates the relaxation time of the RSF responding at the fastest to light variation. Consequently $10^N \times \tau_{min}$ fixes the duration T of an image acquisition. Hence, as soon as N would become large enough (e.g. 10), T would become excessively long and the frequency of image acquisition would not be anymore compatible with the observation of living biological samples (not to mention that it would be highly demanding to find a library of labels with such a broad range of relaxation times). Taking a library of 10 distinguishable RSFPs for illustration, $\tau_{min}$ would be in the 1 ms range so as to yield $T \approx 10^7$ s (i.e. more than 110 days), which is excessively long.

By exploiting n>1 (typically, as it will be discussed below, n=2 or n=4) relaxation times for dynamic contrast discrimination, and therefore n discriminative dimensions, the invention allows a very substantial reduction of the acquisition time and eases the finding of suitable labels. Indeed, the discrimination between two labels still requires relaxation times of their signal to differ by a factor of ten but in (at least) one among the n discriminative dimensions. Hence the overall discriminative window necessitated to image N labels can be shared among the n dimensions so as to possibly reduce to $10^{N/n} \times \tau_{min}$ the width of the acquisition windows along each discriminative dimension. The overall acquisition time becomes then $$T = \Sigma_{k=1}^{n} 10^{N/n} \times \tau_{min,k},$$

where $\tau_{min,k}$ designates the relaxation time of the RSF responding at the fastest to light variation along the dimension k. By assuming that $\tau_{min,k}$ does not depend on the discriminative dimension, using n dimensions for discrimination makes possible to increase the frequency of image acquisition by a factor of $10^{N(1-1/n)}/n$. Taking again a library of 10 distinguishable RSFs with n=4 dimensions and $\tau_{min,}$ $_k$=1 ms for illustration, one has $T \approx 1.3$ s and an increase of the frequency of image acquisition by an impressive factor of $8 \cdot 10^6$.

Moreover, in contrast to some of the other detection/discrimination techniques relying on dynamic contrast, the inventive method is not limited to RSFPs but can also be used with simpler fluorophores such as non-photoswitchable fluorescent proteins (FPs), even if in that case the number n of usable relaxation times is often smaller than for RSFPs.

An important feature of the invention is that it can be applied to both wide-field imaging and to light-scanning microscopy.

An object of the present invention is then a method for detecting or identifying a photochemically active chemical species in a sample, comprising the steps of:
- a) illuminating the sample, according to an illumination sequence, with light of at least a first wavelength suitable to be absorbed by the chemical species triggering a first reaction affecting at least one optical property of the chemical species and comprising at least one photochemically-activated step and one thermally-activated step, wherein the illumination sequence is such that:
  - in at least a first time window of the illumination sequence, a rate of the first reaction is limited by the photochemically-activated step; and
  - in at least a second time window of the illumination sequence, the rate of the first reaction is limited by the thermally-activated step;
- b) measuring the evolution of the optical property of the chemical species during the first and the second time windows;
- c) determining, from said measuring, at least a first and a second time constant representing the rate constants of the first reaction in the first and the second time windows, respectively; and
- d) using the determined time constants for detecting or identifying the chemical species.

Particular embodiments of this method constitute the subject-matter of the dependent claims.

Another object of the invention is an apparatus for carrying out such a method, comprising:
- at least one controlled light source configured for illuminating the sample with light of at least a first wavelength according to a predetermined illumination sequence comprising at least two time windows corresponding to different illumination conditions;
- a light detector configured for measuring the evolution of an optical property of the sample during said time windows; and
- a data processing device configured for determining, from said measuring, a plurality of time constants representing said evolutions during said time windows, and for detecting or identifying a photochemically active chemical species within the sample as a function of the determined time constants.

Additional features and advantages of the present invention will become apparent from the subsequent description, taken in conjunction with the accompanying drawings, wherein:

FIGS. 1A, 1B, 1C and 1D schematically illustrate a concept at the basis of the invention;

FIGS. 2A and 2B illustrate the use of multiple relaxation times to discriminate RSFs according to an embodiment of the invention;

FIG. 3A schematically represents the energy levels of an hypothetical RSF suitable to be used in some embodiments of the invention, and the transitions between these energy levels; FIG. 3B is a reduced energy level scheme obtained through a quasi-steady state approximation.

Figure 6:
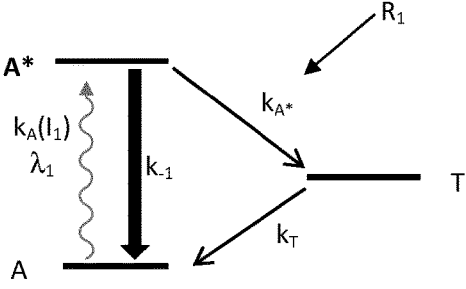
Figure 7A:
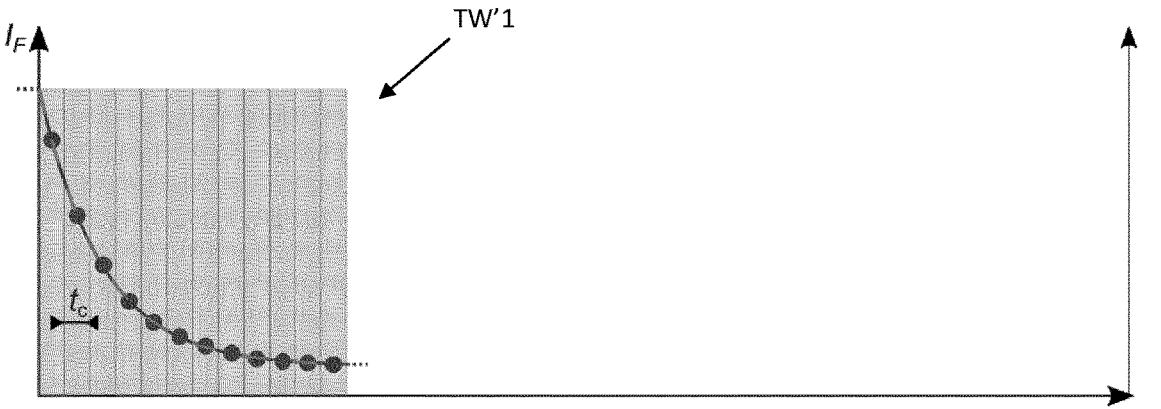
Figure 7B:
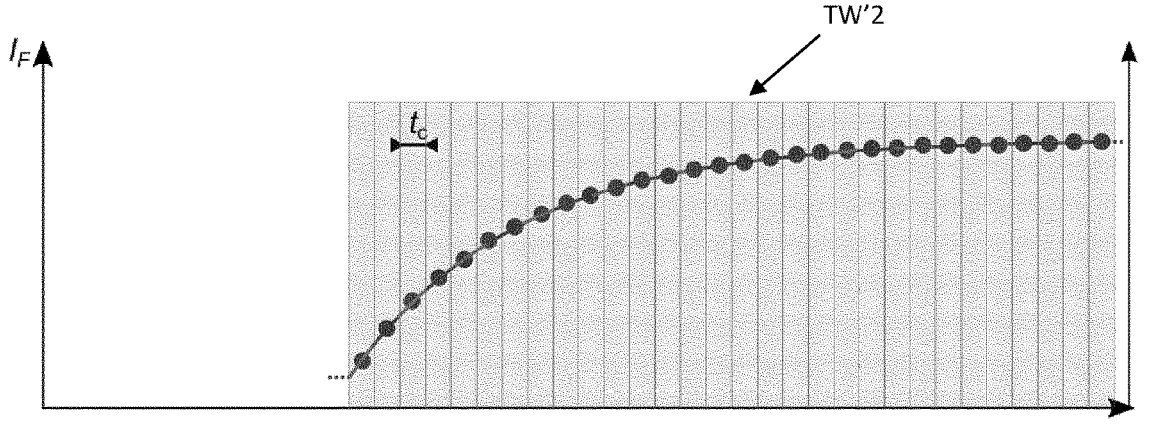
Figure 8A:
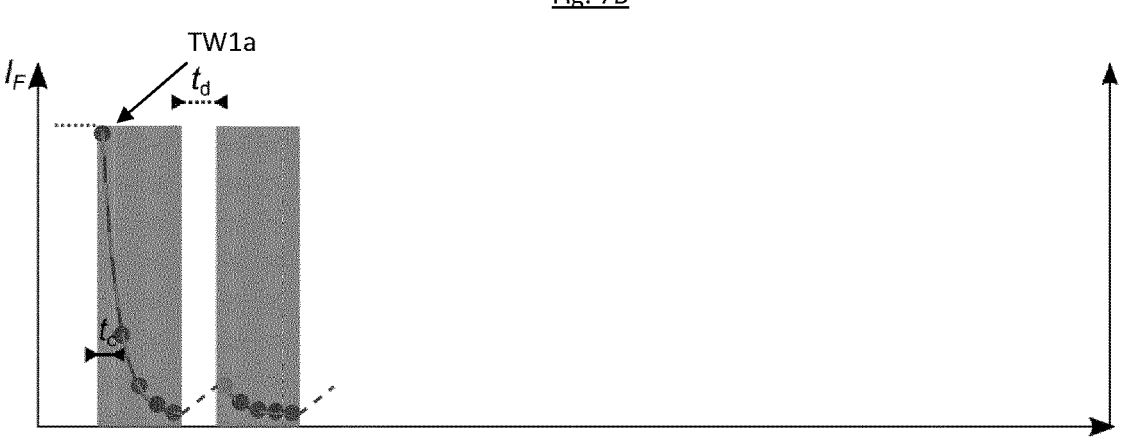
Figure 8B:
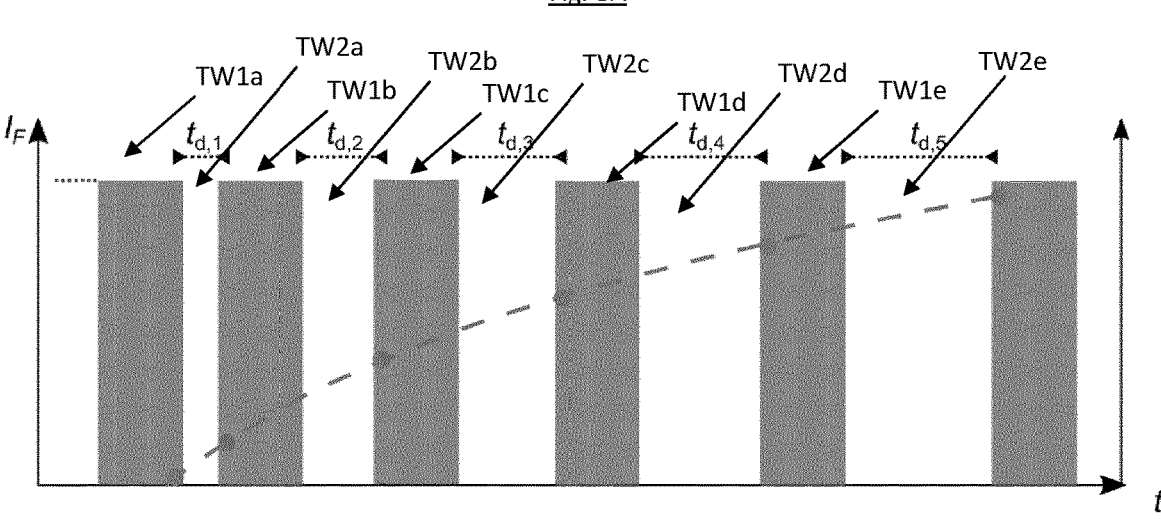
Figure 9A:
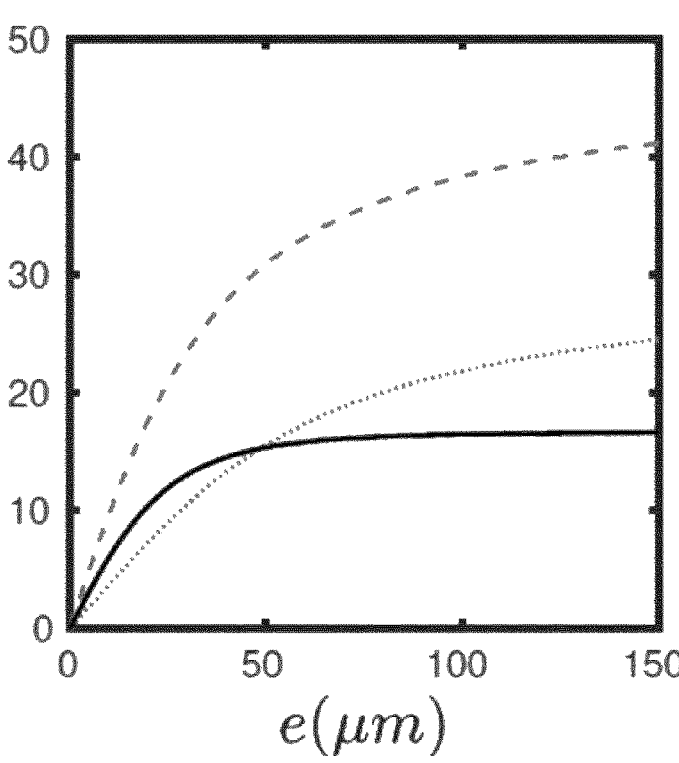
Figure 9B:
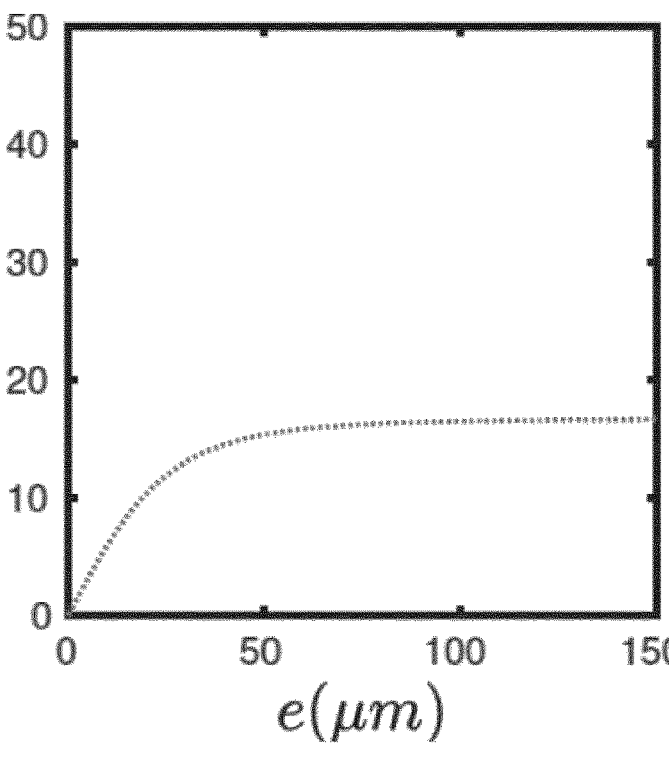
Figure 10:
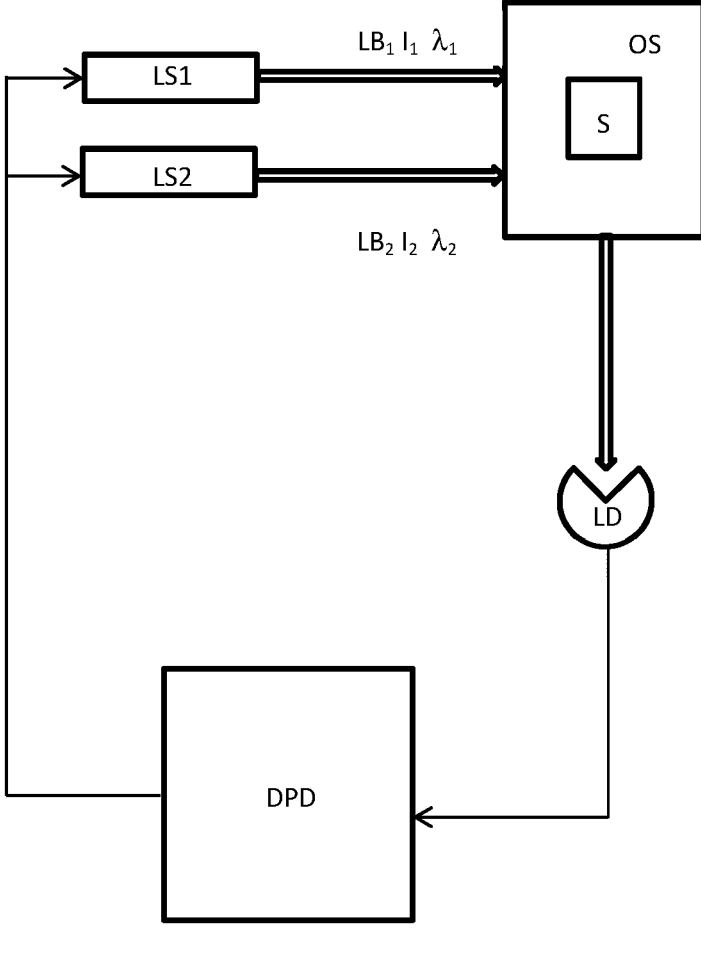

FIG. 6 schematically represents the energy levels of an hypothetical FP suitable to be used in some embodiments of the invention, and the transitions between these energy levels;

FIGS. 7A and 7B illustrate illumination sequences used in a third embodiment of the invention;

FIGS. 8A and 8B illustrate illumination sequences used in a fourth embodiment of the invention;

FIGS. 9A and 9B illustrate the use of relaxation time measurement to provide optical sectioning of a sample according to an embodiment of the invention;

FIG. 10 is a block diagram of an apparatus according to an embodiment of the invention; and FIGS. 11A, 11B and 11C illustrate the application of a method according to an embodiment of the invention to the imaging of Dronpa-labeled Escherichia coli bacteria.

According to the inventive method, the photocycle of an RSF can be assimilated to a network of $n_s$ states $C_1 \ldots C_{ns}$ engaged in first-order photochemically- and thermally-driven reactions. The $n_\lambda$ wavelengths are set to values leading to reversible photochemical reaction of at least one state. A change in illumination of the RSF induces an evolution of the concentrations of the RSF states and consequently of the fluorescence signal, assuming that at least some of the $n_s$ states exhibit different brightness. This evolution can be expressed as a linear combination of $n_s-1$ exponential terms, whose amplitudes and relaxation times depend on the rate constants of the reactions of the RSF photocycle. The rate constants of the photochemical steps of the photocycle are set by the light intensities (e.g. they are proportional to light intensities with one-photon excitation), while those of the thermal steps are not. The change of the RSF fluorescence signal is limited by the slowest steps associated with the lowest rate constants, i.e. the largest relaxation times. As a consequence, the time response of the RSF fluorescence to a change in illumination conditions depends on the light intensities. Applying not one but multiple successive illumination conditions (e.g. light intensity values), it is possible to probe kinetics of the RSF fluorescence change associated with different rate-limiting steps and therefore obtain non-redundant information. The relaxation times associated with each different illumination condition constitute as many dimensions for RSF discrimination, leading to a greater selectivity than the prior art method, and therefore increasing the number of distinguishable spectrally similar RSFs.

From a theoretical point of view (for a more detailed discussion of the theory, see [Summers 1988]), as the reactions are first-order, the concentrations $c_1, c_2, \ldots, c_{ns}$ of the $n_s$ states follow the equation:

$$\frac{dc}{dt} = Kc \qquad (1)$$

where c is a column vector containing the concentration values and K is a $n_s \times n_s$ matrix. Each nondiagonal elements of K, $k_{ij}$ $i \neq j$, is the rate constant of the reaction $C_i \rightarrow C_j$; each diagonal element of K, $k_{ii}$, is the sum of all the rate constants transforming state $C_i$ in any other state of the photocycle:

$$k_{ii} = -\sum_{j \neq i} k_{ij} \qquad (2)$$

It can be shown that matrix K has $n_s$ eigenvalues, one of which is zero. Under relevant experimental conditions, the $n_s-1$ nontrivial eigenvalues are real and negative, and can therefore be designated by $-1/\tau_i$. The time evolution of the concentration of state $C_i$ for constant illumination conditions is then expressed by:

$$c_i = \sum_{j=1}^{n_s-1} r_{ij} \exp\left(-\frac{t}{\tau_j}\right) + s_i \qquad (3)$$

where the preexponential factors $r_{ij}$ and the constant $s_i$ depend on the rate constants and on the initial conditions.

Similarly, the fluorescence intensity $I_F$ evolves as:

$$I_F = \sum_{j=1}^{n_s-1} U_j \exp\left(-\frac{t}{\tau_j}\right) + W \qquad (4)$$

where $$U_j = \Sigma_{i=1}^{n_s} Q_i r_{ij}$$

and $$W = \Sigma_{i=1}^{n_s} Q_i s_i,$$

$Q_i$ being the brightness of state $C_i$.

Therefore, the fluorescence signal exhibits a multiexponential time dependence which varies with the light intensity, as explained above.

Figure 1A:
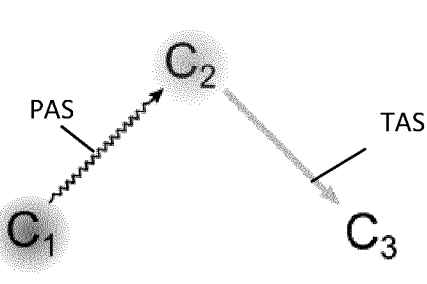
Figure 1B:
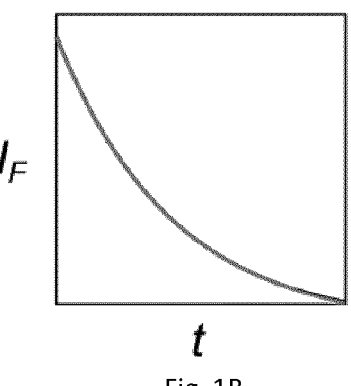
Figure 1C:
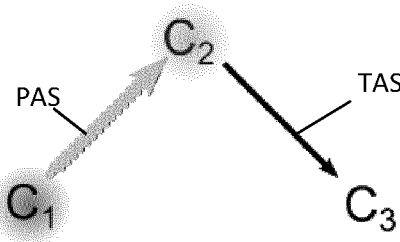
Figure 1D:
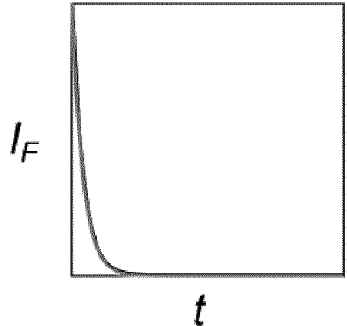

FIGS. 1A-1D illustrate the basic principle of the inventive method for a very simple case where $n_s=3$ and $n_x=1$. An hypothetical RSF has $n_s=3$ states: ground state $C_1$, which is fluorescent with brightness $Q_1$; state $C_2$ which is fluorescent with brightness $Q_2$, e.g. lower than $Q_1$, and state $C_3$ which is not fluorescent (is "dark"). Reaction PAS, converting $C_1$ into $C_2$, is photochemical, with a rate constant $k_{12}=\kappa_{12}I_\lambda$, where $I_\lambda$ is the light intensity at a specific wavelength $\lambda$; reaction TAS, converting $C_2$ into $C_3$, is thermal and has a rate constant $k_{23}$ which is independent of light intensity. FIGS. 1A and 1B refer to the situation where $I_\lambda$ is sufficiently low for having $k_{12} \ll k_{23}$ (for this reason, the wavy arrow representing the $C_1 \rightarrow C_2$ transition is thin and black—to indicate that it is the rate-limiting step of the mechanism to convert $C_1$ into $C_3$—on FIG. 1A). As a consequence, the kinetics of the $C_1$ into $C_3$ conversion is dominated by the photochemical step: the decrease of the fluorescent intensity $I_F$ with time (FIG. 1B) is mainly representative of $k_{12}$. FIGS. 1C and 1D refer to the situation where $l_x$ is sufficiently high for having $k_{12} \gg k_{23}$ (for this reason, the wavy arrow representing the $C_1 \rightarrow C_2$ transition is thick and not anymore black but grey on FIG. 1C). As a consequence, the kinetics of the $C_1$ into $C_3$ conversion is dominated by the thermal step: the decrease of the fluorescent intensity $I_F$ with time (FIG. 1D) is mainly representative of $k_{23}$. The two measured relaxation times corresponding to the different light intensities constitute two "labels" identifying the RSF.

This latter point will be described in more detail with the help of FIGS. 2A and 2B which, unlike FIGS. 1A—1D, relate to actual experimental data.

As it has been explained above, an RSF can be identified by a set of relaxation times $\tau_i$ measured under different illumination conditions. In the example of FIGS. 1A—1D, only two relaxation times are measured, corresponding to different light intensities at a same wavelength, but the use of multi-wavelength illumination allows having access to a larger number of relaxation times.

These relaxation times—or suitable functions thereof—can be used as discriminative dimensions for identifying the RSF. Given that relaxation times for a same RSF may span several orders of magnitude, it is often advantageous to use their logarithms: $l_i=\log(\tau_i)$. Ideally, an RSF can then be represented by a point in a multidimensional space ("discriminating space") whose dimensions are parameterized by the logarithms of the relaxation times $l_i$. Due to measurement noise, however, it is more accurate to represent it as a hypersphere or hyper-ellipsoid whose radius or axes are suitable functions of the standard deviations of the relaxation times.

A distance $d_{ij}$ between pairs of RSFs—identified by indices i and j—can then be defined in the discriminating space. For instance, it can be a Euclidian distance in the space parametrized by the logarithms of the relaxation times $l_i$, i.e. a logarithmic distance in a space directly parametrized by the relaxation times:

$$d_{ij} = \sqrt{\sum_k (l_{ki} - l_{kj})^2} \tag{5}$$

where $l_{ki}=\log(\tau_{ki})$, $\tau_{ki}$ being the k-th relaxation time of RSF "i".

In order to optimize the discriminating power of the inventive method, it is necessary to choose, among a set s(N) of N available RSFs, a subset of RSFs maximizing their relative distances. In turn, this requires ranking the N RSFs according to their distance between pairs.

According to a first embodiment of the invention, optimized subsets s'(m) of m RSFs are determined for m=2; . . . ; N. The minimum distances $d_{min}$ between pairs are computed for all subsets of m RSFs included in s(N). The subset s'(m) with the maximum value of $d_{min}$ is selected.

A drawback of this approach is that it does not ensure that s'(m)⊂s'(m+1). For instance, the optimal subset of m=3 RSFs is not necessarily constituted by the optimal subset of m=2 RSFs plus an additional RSF. This may be a drawback for end-users who would like to use a same set of RSFs in order to discriminate various numbers of its members.

A ranking method according to a second embodiment of the invention ensures s'(m)⊂s'(m+1).

This method, which takes into account three-body interactions between RSFs, begins by sorting pairs by increasing distances and sequentially eliminating the RSF which is the closest to two other RSFs. Specifically, the pair associated with the smallest distance in the set s(N) of N RSFs is denoted (i; j). The closest RSF to i different from j is denoted k and the closest RSF to j different from i is denoted I. If the distance $d_{ik}$ is smaller than $d_{jl}$, the RSF i is the closest RSF to two RSFs. The rank assigned to the RSF i in the ordered list is equal to the number N of RSFs in the set s(N). Then the RSF i is removed from the set s(N) leading to the set s(N−1) of N−1 RSFs. The procedure is repeated until set s(2) has been built. Rankings 1 and 2 are assigned to the two RSFs of the remaining pair s(2).

Discrimination between two RSFs is possible if their distance is larger than the cutoff distance $d_c$ imposed by the experimental accuracy $\Delta d_{ij}$ on the distance $d_{ij}$ induced by the uncertainty $\Delta l_{ki}$ on the logarithm of the relaxation times $l_{ki}$ $$\Delta d_{ij} = \frac{1}{d_{ij}} \sum_{k=1}^{n} |l_{ki} - l_{kj}| \Delta |l_{ki} - l_{kj}| \tag{6A}$$

A statistical analysis shows that an optimal choice for the cutoff distance is $$d_c = 2M\sqrt{n} \tag{6B}$$

where $$M = \max_{k,i}(\Delta l_{ki}) \tag{6C}$$

and n is the number of discriminating dimensions.

Figure 2A:
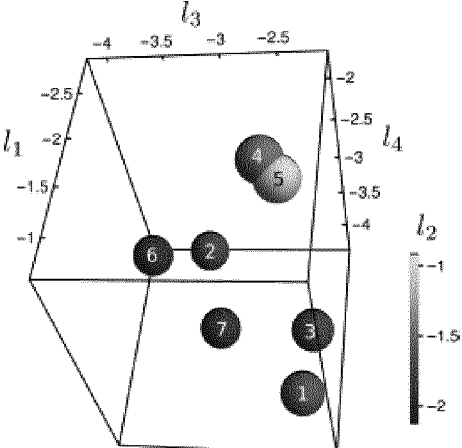

FIG. 2A represents the position of seven spectrally similar RSFPs in a four-dimensional discriminating space, parameterized by logarithms $l_i$. As a region of a four-dimensional space cannot be directly drawn on a sheet, the second dimension parameterized by $l_2$ is represented by shades of gray.

The RSFPs—designated by reference number 1 to 7 are:

1: Dronpa
2: Dronpa-2
3: Dronpa-3
4: Kohinoor
5: Padron
6: rsEGFP2
7: rsFastLime.

Two different types of illumination where used, both at two different intensities:

Type-I: illumination at $\lambda_1=488$ nm:
  $I_{low}$: intensity sufficiently low for kinetics to be dominated by a photochemical step (e.g. corresponding to a photonic flux of 2 mol·s$^{-1}$·m$^{-2}$);
  $I_{high}$: intensity sufficiently high for kinetics to be dominated by a thermal step (e.g. corresponding to a photonic flux of 200 mol·s$^{-1}$·m$^{-2}$);

Type-II: bichromatic illumination at $\lambda_1=488$ nm and $\lambda_2=405$ nm (illumination at $\lambda_2$ is used for inducing a photochemical reaction; illumination at $\lambda_1$ is only used to probe the reaction dynamics by exciting fluorescent emission):
  $II_{low}$: intensity at $\lambda_2$ sufficiently low for kinetics to be dominated by a photochemical step (e.g. corresponding to a photonic flux of 0.1 mol·s$^{-1}$·m$^{-2}$) and intensity at $\lambda_1$ corresponding e.g. to a photonic flux of 2 mol·s$^{-1}$·m$^{-2}$;
  $II_{high}$: intensity at $\lambda_2$ sufficiently high for kinetics to be dominated by a thermal step (e.g. corresponding to a photonic flux of 90 mol·s$^{-1}$·m$^{-2}$) and intensity at $X_i$ corresponding e.g. to a photonic flux of 200 mol·s$^{-1}$·m$^{-2}$.

Fluorescence is measured at 525 nm.

Parameter $l_1$ is the logarithm of the relaxation time corresponding to $I_{low}$ illumination, $l_2$ is the logarithm of the relaxation time corresponding to $I_{high}$ illumination, $l_3$ is the logarithm of the relaxation time corresponding to $II_{low}$ illumination and $l_4$ is the logarithm of the relaxation time corresponding to $II_{high}$ illumination.

It can be seen in FIG. 2A that the (hyper)spheres representing the seven RSFPs are well separated, meaning that the RSFPs can be discriminated (the hyperspheres of RSFPs 4 and 5 seem to overlap partially, but this is an artifact due to the projection onto a three-dimensional subspace: the difference in shade of gray show that in fact they are well separated along the dimension parameterized by $l_2$).

Figure 2B:
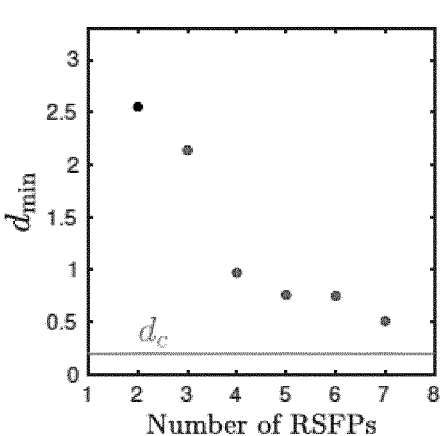

FIG. 2B is a plot of the minimum distance $d_{min}$ between pairs of RSFPs as a function of the number of RSFPs considered. It can be seen that, even when all seven RSFPs are taken into account, the minimum distance exceeds the threshold level $d_c$ (see equations 6A-6C) ensuring that the hyperspheres do not intersect, and therefore that RSFPs can be unambiguously identified. This confirms the result already visible on FIG. 2A.

Being able to discriminate seven spectrally similar RSFPs resorting to neither subtraction nor deconvolution is already a significant progress over the prior art. The inventive method, however, has an even greater discriminating power. Recent results obtained by the inventors show that it is possible to discriminate at least 20 spectrally similar RSFPs.

As it will be discussed in detail later, with reference to FIGS. 6 to 8B, the inventive method is not limited to RSFs, but it also applies to simpler fluorescent chemical species, such as fluorescent proteins (FPs), even if the simpler dynamics of these fluorophores may lead to a somehow smaller number of discriminatory dimensions. For instance, the inventors have been able to discriminate 10 spectrally similar FPs.

Figure 3A:
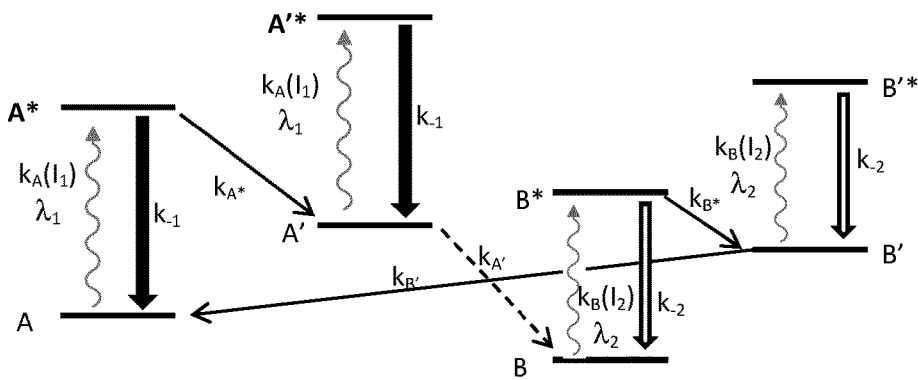
Figure 3B:
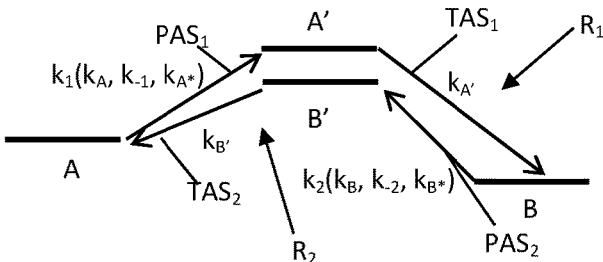
Figure 4A:
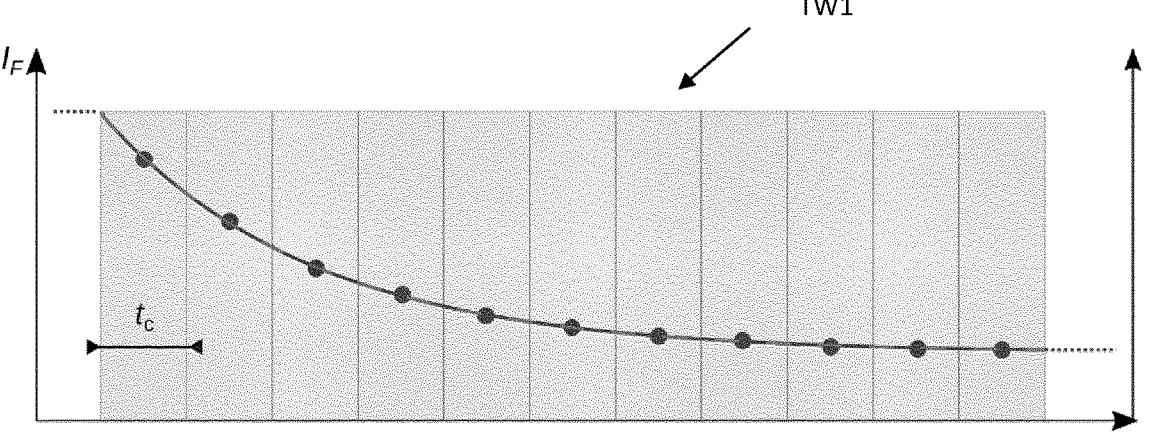
FIGS. 4A to 4D illustrate illumination sequences used in a first embodiment of the invention.
Figure 4B:
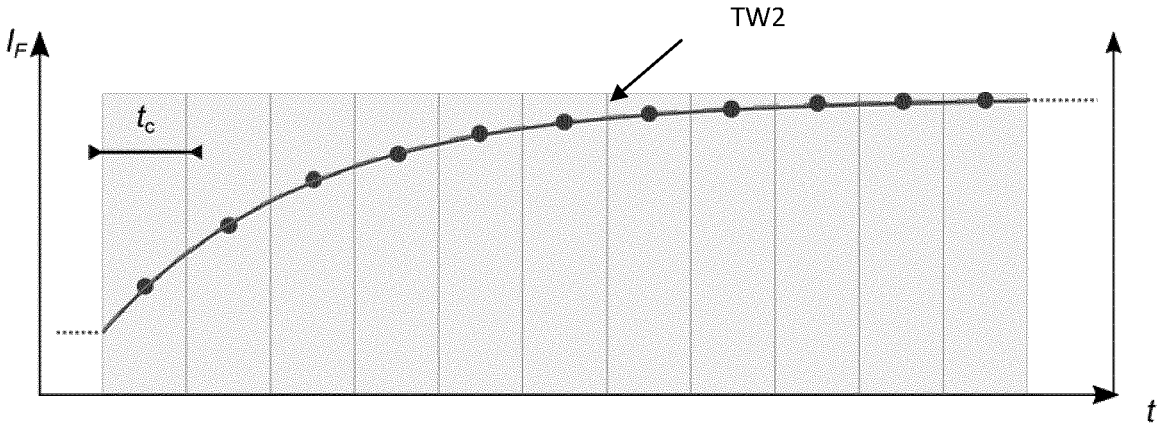
Figure 4C:
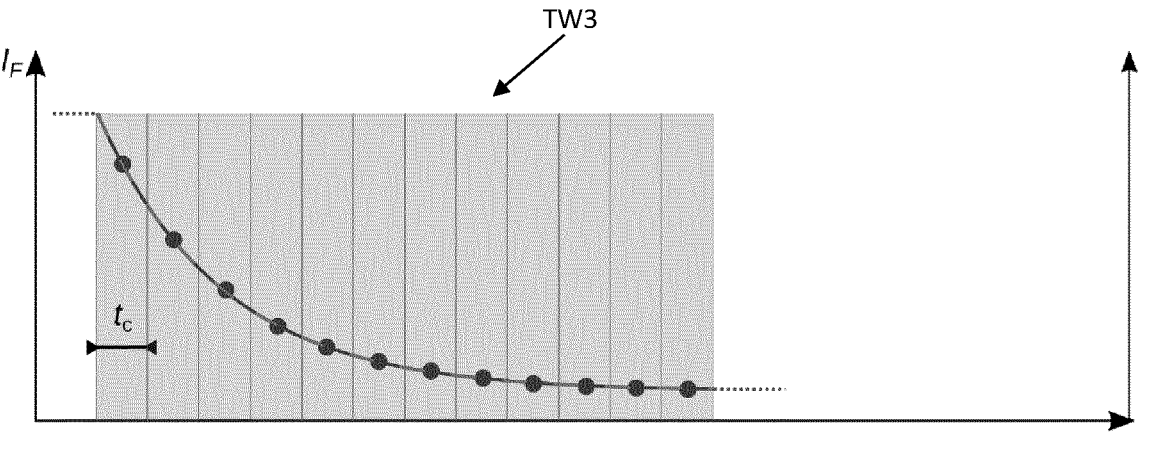
Figure 4D:
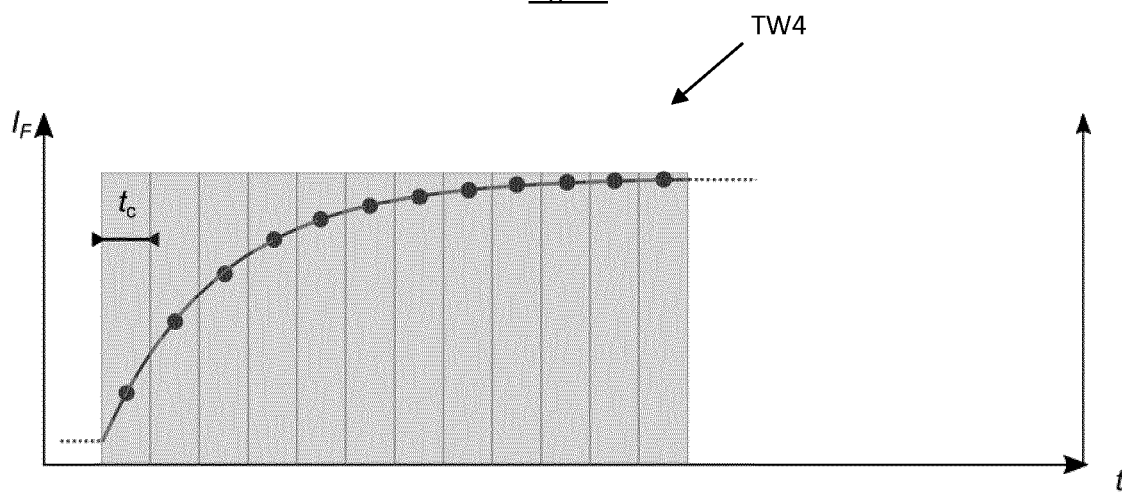

The theoretical principle of the invention has been described above with reference to a hypothetical RSF having a very simple photocycle, illustrated in FIGS. 1A and 1C. FIGS. 3A and 3B illustrate a more complex photocycle, modeling the behavior of actual RSFs such as the RSFPs 1 to 7 mentioned above. A description of this photocycle will allow introducing two sets of illumination sequences used in two respective embodiments of the inventive method.

The hypothetical RSF of FIG. 3A can take four different configurations, designated by A, A', B and B', each one existing either in a ground state or in an excited state A*, A'*, B*, B'*. States A* and A'* are fluorescent and, for the sake of simplicity, they are considered to have a same brightness and identical absorption and fluorescence spectra. States B* and B'* are not fluorescent, or have a much lower brightness than A* and A'*.

Absorption of a photon at wavelength $\lambda_1$ excites state A to A* and state A' to A'* with a rate constant $k_A(I_1)$ proportional to the light intensity $I_1$ at wavelength $\lambda_1$. Radiative decay occurs very fast, with rate constant $k_{-1}$, independent of light intensity. Moreover, state A* can also experience non-radiative decay to state A' at a thermal (i.e. independent of light intensity) rate constant $k_{A*}$, and A' can experience non-radiative decay to state B at a comparatively small thermal rate $k_{A'}$. The conversion of molecules from state A to B, through a photochemical step (A→A*) and two thermal steps (A*→A', quite fast, and A'→B, slow) results in a progressive reduction of the fluorescence intensity.

Absorption of a photon at wavelength $\lambda_2$ excites state B to B* and state B' to B'* with a rate constant $k_B(I_2)$ proportional to the light intensity $I_2$ at wavelength $\lambda_2$. Non-radiative decay occurs very fast, with rate $k_{-2}$, independent from light intensity. Moreover, state B* can also experience a slower non-radiative decay to state B' at a thermal (i.e. independent from light intensity) rate $k_{B*}$, and B' can experience non-radiative decay to state A. The conversion of molecules in state B to A, through a photochemical step (B→B*) and two thermal steps (B*→B', B'→A) results in a progressive recovery of fluorescence.

For realistic light intensities, state A* is created with a rate constant ($k_A$) which is much lower than the destruction rate constant ($k_{-1}+k_{A*}$), therefore a quasi-steady state is quickly achieved. The same applies to states A'*, B* and B'*. This leads to the simplified photocycle of FIG. 3B, comprising only states A, A', B and B'; it is a $n_s=4$, $n_\lambda=2$ network.

Fluorescence emission is proportional to the sums of the concentrations of A and A' (weighted sum, if the brightness of these states are different).

Bright state A is converted into dark state B through a first reaction $R_1$ comprising a photochemical step $PAS_1$ A→A' with rate constant $k_1$, which is a function of $k_A$, $k_{-1}$ and $k_{A*}$ and depends on $I_1$ through $k_A$, and a thermal step $TAS_1$ A'→B with intensity-independent rate constant $k_{A'}$ (note that the first step alone does not affect the fluorescence signal, under the simplifying assumption of identical brightness of A and A'). Dark state B is converted back to bright state A through a second reaction $R_2$ comprising a photochemical step $PAS_2$ B→B' with rate constant $k_2$, which is a function of $k_B$, $k_{-2}$ and $k_{B*}$ and depends on $I_2$ through $k_B$, and a thermal step $TAS_2$ B'→A with intensity-independent rate constant $k_{B'}$ (note that the first step alone does not affect the fluorescence signal, as both B and B' are dark).

Illuminating the RSF at wavelength $\lambda_1$ (illumination type I) induces then a fluorescence signal decreasing with time. At "low" $I_1$ values (i.e. light intensities at $\lambda_1$), the decay rate of the fluorescent signal will essentially be determined by the photochemical step $PAS_1$, while at "high" $I_1$ values it will essentially be determined by the thermal step $TAS_1$. Therefore, measurements at different light intensities at wavelength $\lambda_1$ ($I_{low}$ and $I_{high}$ conditions) will provide non-redundant information on the RSF dynamics.

When the fluorescence signal is extinguished, or at least has reached a plateau, illuminating RSF at both wavelengths $\lambda_2$ and $\lambda_1$ (illumination type II) will induce a recovery of the fluorescence signal. Note that the recovery is due to the photochemical reaction induced by photons at $\lambda_2$, but photons at $\lambda_1$ are required to excite A and A' and get non-vanishing fluorescence emission. At "low" $I_2$ values (i.e. light intensities at $\lambda_2$), the recovery rate of the fluorescent signal will essentially be determined by the photochemical step $PAS_2$, while at "high" $I_2$ values it will essentially be determined by the thermal step $TAS_2$. Therefore, measurements at different light intensities at wavelength $\lambda_2$ ($II_{low}$ and $II_{high}$ conditions) will provide additional non-redundant information on the RSF dynamics. Overall, the RSF can be identified by four relaxation times issued from four measurements performed in different illumination conditions, enabling discrimination in a four-dimensional space, as discussed above.

A first, rather straightforward, experimental protocol for measuring these four relaxation times will now be discussed with the help of FIGS. 4A-4D. This protocol is adapted to be implemented, for instance, using a wide-field microscope for illuminating a sample containing RSFs and imaging their fluorescence.

Initially, all the RSF molecules are in their state A. In an initial time window TW1, illumination $I_{low}$ is maintained constant and the emitted fluorescence photons are collected over successive time windows of width $t_c$ using a camera forming a wide-field image of the sample. The image built during $t_c$ is then transferred in a time $t_d \ll t_c$ which is neglected in the figure. The time series of fluorescence signals (averaged over $t_c$) for every pixel of the camera retraces the kinetics of the photoactivation step of an RSF present in the region of the sample corresponding to the pixel (it is assumed that such a region only contains RSF of a same species) in a regime of low light intensity. Data processing (which will be described later) allows extracting a single relaxation time characterizing the kinetics in the first temporal window.

Then similar measurements and analyses are performed in a subsequent time window TW2 under illumination $II_{low}$ (during which the fluorescence signal recovers), then in another time window TW3 under illumination $I_{high}$ (note that the relaxation time is shorter than at lower intensity, as the photochemical step $PAS_1$ no longer constitute a "bottleneck" slowing down the conversion A→B), and in a final time window TW4 under illumination $II_{high}$ (faster recovery, as the photochemical step $PAS_2$ no longer constitutes a "bottleneck" slowing down the conversion B→A).

The sequence TW1—TW2—TW3—TW4 may be repeated several times if required.

A second experimental protocol for measuring these four relaxation times will now be discussed with the help of FIGS. 5A-5D. This second protocol can be implemented using a scanning microscope.

When a scanning microscope is used, each point of the sample is illuminated by a series of light pulses which are typically much shorter than the acquisition time used in wide-field microscopy, but have a much higher instantaneous intensity. Therefore, the instantaneous intensity of the light illuminating a point of the sample is either zero or so high that the photochemical step is not limiting for the reaction kinetics. Therefore, the "low intensity" regime cannot be accessed directly. However, it can be "simulated" by ensuring that the fluence of each pulse (i.e. its intensity-duration product, assuming that the pulses are rectangular) is low enough.

Figure 5A:
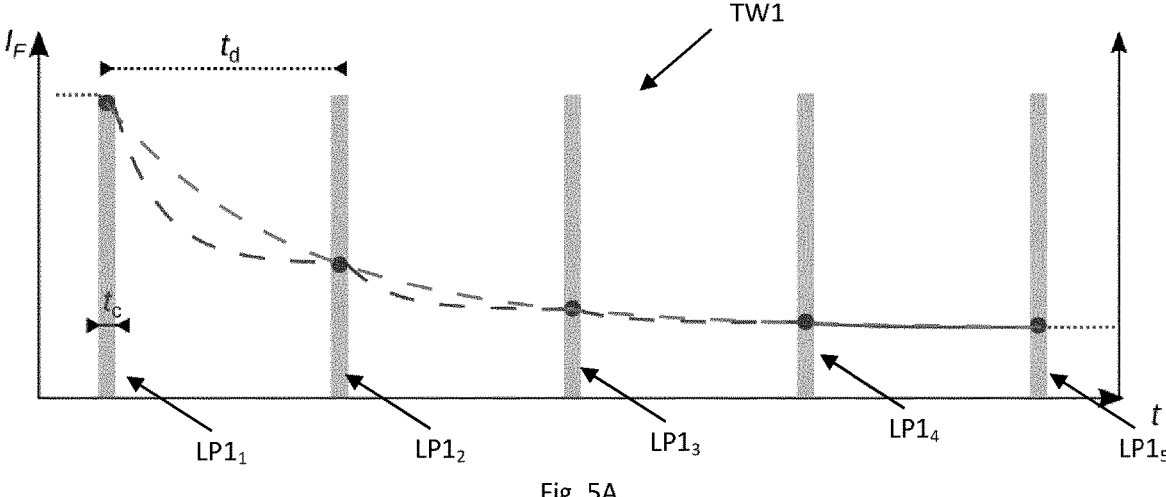
FIGS. 5A to 5D illustrate illumination sequences used in a second embodiment of the invention.
Figure 5B:
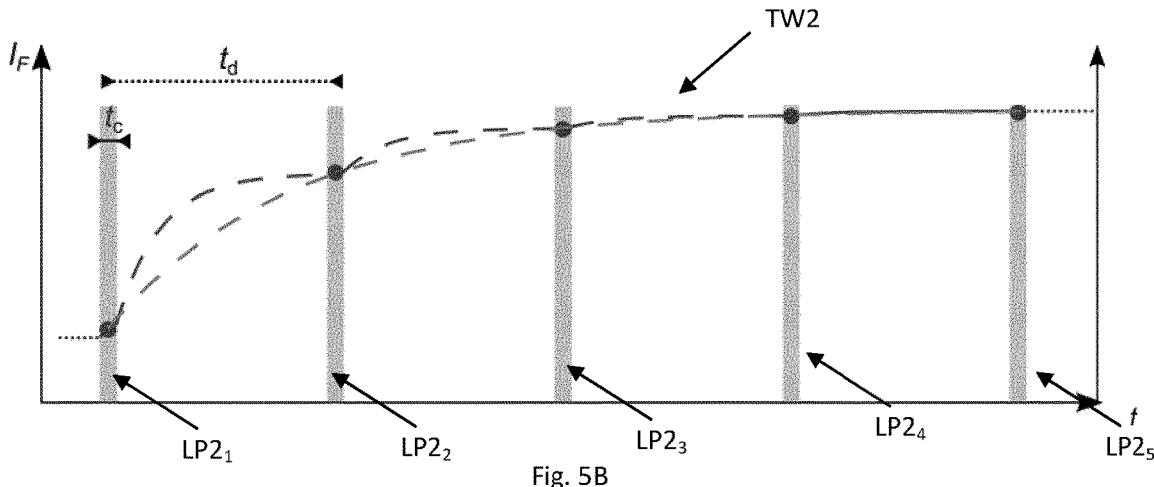

As illustrated in FIG. 5A, in an initial time window TW1, a series of light pulses $LP1_1$, $LP1_2$, $LP1_3$, $LP1_4$, $LP1_5$ . . . at wavelength $\lambda_1$ and of duration $t_c$, separated by time intervals $t_d$ are directed on each small region of the sample (typically, this is obtained by moving a laser beam across the sample). The RSF contained in the region of the sample is initially in its state A. After application of a first pulse $LP1_1$ of intensity $I_1$ and duration $t_c$ (and therefore fluence $I_1 t_c$) a fraction $(1—e^{-k_1(I_1)t_c})$ of the RSF molecules has been converted into the A' state. Fluence $I_1 t_c$ is chosen such that $1>(1—e^{-k_1(I_1)t_c})>0$, i.e. a significant fraction of the RSF molecules remains in the A state. Time interval $t_d$ is sufficiently long for ensuring that all the molecules in state A' are thermally converted into B (this is represented by the dark gray dashed line in FIG. 5A). Therefore, at time $t_c+t_d$, a fraction $e^{-k_1(I_1)t_c}$ of the molecules remains in the A state and can fluoresce, the other molecules being inactivated. When a second pulse is applied, the detected fluorescent signal is therefore decreased by a factor $e^{-k_1(I_1)t_c}$ compared to the signal collected during the first pulse. Moreover, the second pulse further transfers a fraction $(1—e^{-k_1(I_1)t_c})$ of the molecules remaining in A to A', and these molecules are then thermally converted into state B during the second interval $t_d$, and so on. Measuring the decrease of the fluorescence signal acquired during successive pulses (see the light gray dashed line on FIG. 5A, which provides a guide to the eye) allows determining the value of $k_1$, like in the wide-field low-intensity measurement of FIG. 4A.

In a subsequent time window TW2 applied at the end of time window TW1, another series of light pulses $LP2_1$, $LP2_2$, $LP2_3$, $LP2_4$, $LP2_5$ . . . at wavelength $\lambda_2$ and of duration $t_c$, separated by time intervals $t_d$ are directed on each small region of the sample (typically, this is obtained by moving a laser beam across the sample). During this time window illumination at $\lambda_1$ is also used not to induce a photochemical reaction, but simply to probe it by inducing fluorescent emission. The RSF contained in the region of the sample is initially in its state B. After application of a first pulse $LP2_1$ of intensity $I_2$ and duration $t_c$ (and therefore fluence $I_2 t_c$) a fraction $(1—e^{-k_2(I_2)t_c})$ of the RSF molecules has been converted into the B' state. Fluence $I_2 t_c$ is chosen such that $1>(1—e^{-k_2(I_2)t_c})>0$, i.e. a significant fraction of the RSF molecules remains in the B state. Time interval $t_d$ is sufficiently long for ensuring that all the molecules in state B' are thermally converted into A (this is represented by the dark gray dashed line in FIG. 5B), which is fluorescent. Therefore, at time $t_c+t_d$, a fraction $e^{-k_2(I_2)t_c}$ of the molecules remains in the B state. When a second pulse is applied, the detected fluorescent signal is therefore increased by a factor $(1—e^{-k_1(I_1)t_c})$ compared to the signal collected during the first pulse. Moreover, the second pulse further transfers a fraction $(1—e^{-k_2(I_2)t_c})$ of the molecules remaining in B to B', and these molecules are then thermally converted into state A during the second interval $t_d$, and so on. Measuring the increase of the fluorescence signal acquired during successive pulses (see the light gray dashed line on FIG. 5B, which provides a guide to the eye) allows determining the value of $k_2$, like in the wide-field low-intensity measurement of FIG. 4B.

Figure 5C:
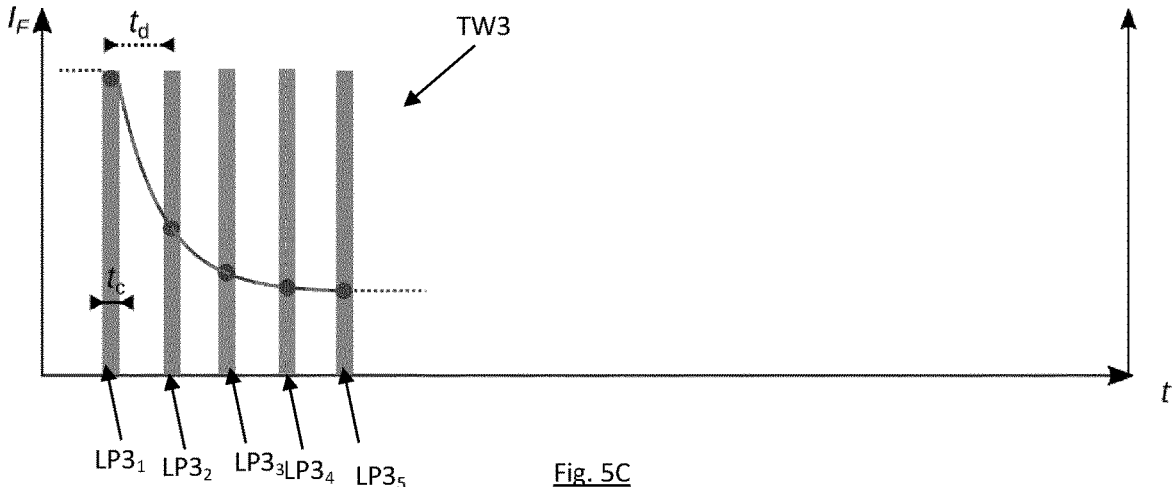

As illustrated in FIG. 5C, in a subsequent time window TW3, yet another series of light pulses $LP3_1$, $LP3_2$, $LP3_3$, $LP3_4$, $LP3_5$ . . . at wavelength $\lambda_1$ and of duration $t_c$, separated by time intervals $t_d$ are directed on each small region of the sample. Again, the RSF contained in the region of the sample is initially in its state A. This time, however, the fluence of the first pulse $LP3_1$ is high enough to convert the RSF molecules into the A' state. From the A' state, the molecules convert into dark state B with a rate constant $k_{A'}$. The successive pulses $LP3_2$, $LP3_3$, $LP3_4$, $LP3_5$ . . . are only used to sample the evolution of the fluorescence signal, which is proportional to the concentration of the A' state, decaying as $e^{-k_{A'}t}$. This allows determining $k_{A'}$, like in the wide-field high-intensity measurement of FIG. 4C. Note that intervals $t_d$ should be sufficiently short to allow sampling this evolution—typically they will be much shorter than in the first window.

Figure 5D:
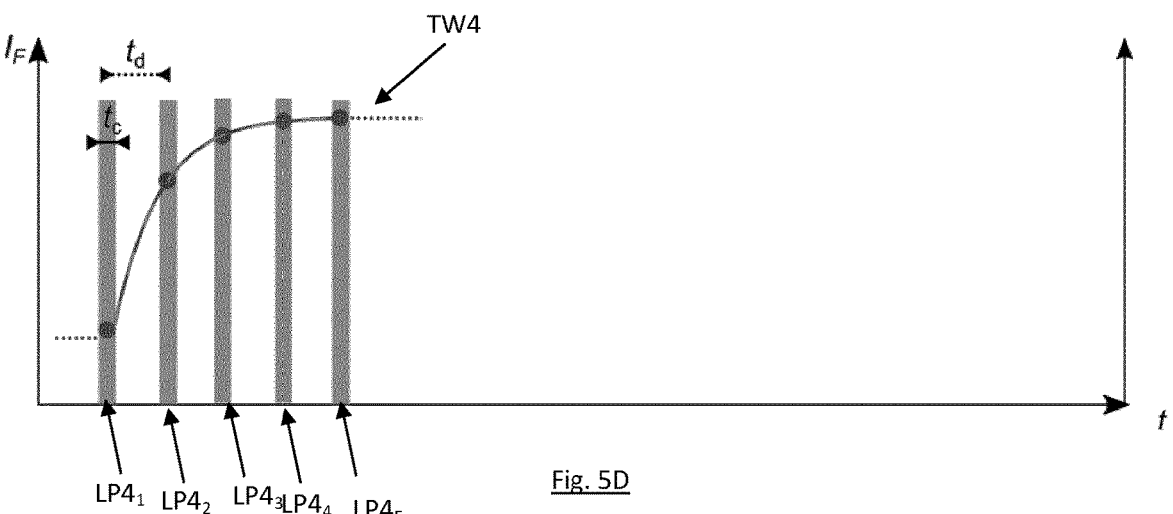

As illustrated in FIG. 5D, in a final time window TW4 applied at the end of the third time window TW3, another series of light pulses $LP4_1$, $LP4_2$, $LP4_3$, $LP4_4$, $LP4_5$ . . . at wavelength $\lambda_2$ and of duration $t_c$, separated by time intervals $t_d$ are directed on each small region of the sample. During this time window illumination at $\lambda_1$ is also used not to induce a photochemical reaction, but simply to probe it by inducing fluorescent emission. The RSF contained in the region of the sample is initially in its state B. This time, however, the fluence of the first pulse $LP4_1$ is high enough to convert the RSF molecules into the B' state. From the B' state, the molecules convert into the bright state A with a rate constant $k_{B'}$. The successive pulses $LP4_2$, $LP4_3$, $LP4_4$, $LP4_5$ . . . are only used to sample the evolution of the fluorescence signal, which is proportional to the concentration of the A state, increasing as $(1—e^{-k_{B'}t})$. This allows determining $k_{B'}$, like in the wide-field high-intensity measurement of FIG. 4D. Note that intervals $t_d$ should be sufficiently short to allow sampling this evolution—typically they will be much shorter than in the first window.

The sequence TW1—TW2—TW3—TW4 may be repeated several times if required.

Fluorescent proteins (FPs) have long been considered as non-photoswitchable. However, some of them have been recently demonstrated to form a dark lower triplet state, exhibiting a broad absorption throughout the visible-near IR range (see [Byrdin 2018]). FIG. 6 shows the energy levels and the transitions for such a molecule. Absorption of a photon at wavelength $\lambda_1$ excites ground state A to A* with a rate constant $k_A(I_1)$ proportional to the light intensity $I_1$. Radiative decay occurs very fast, with rate constant $k_{-1}$, independent of light intensity. Moreover, state A* can also experience non-radiative decay to the dark triplet state T at a much lower thermal (i.e. independent of light intensity) rate constant $k_{A*}$. In turn, the triplet state T returns to the ground state A with a thermal rate constant $k_T$.

FIGS. 7A and 7B illustrate a protocol, adapted to be implemented, for instance, using a wide-field microscope, for measuring two rate constants of the FP of FIG. 6.

As illustrated in FIG. 7A, in an initial time window TW1' the FP is illuminated at wavelength $\lambda_1$ and at a sufficiently high intensity ($I_{high}$ conditions). The illumination induces fluorescence emission, but also depopulation of the A and A* states and population of the dark T state through the photochemical step A→A* and the thermal step A*→T. Therefore, the fluorescence intensity decreases. The decrease is sampled and used to determine the rate of the limiting (slowest) step. In the case of FPs, even at rather high intensities the limiting step is the photochemical one, therefore the measurements performed during TW1' allow determining $k_1$, which is a function of $k_A$, $k_{-1}$, and $k_{A*}$ and depends on $I_1$ through $k_A$.

In a subsequent time window TW2', the light intensity level is maintained at a much lower level (illuminating conditions III), so low that its photochemical effect can be ignored. During the second time window, level A is populated by the thermal reaction step T→A. The increase of the concentration of A is tracked by measuring the fluorescence emission stimulated by the residual illumination. This is illustrated in FIG. 7B.

The sequence TW1'—TW' may be repeated several times if required.

It is interesting to note that, unlike in the case of RSF described with reference to FIGS. 4A-4D, according to this protocol applicable to FPs, a photochemical rate constant is measured at high light intensity and a thermal one at (very) low intensity.

FIGS. 8A and 8B illustrate a different protocol for FPs, suitable to be implemented using a scanning microscope. Illumination condition $I_{high}$ is applied over a plurality of time windows $TW1_a$, $TW1_b$, $TW1_c$, $TW1_d$, . . . of a same duration $p \times t_c$ (p is typically 5), separated by time windows of increasing durations $t_{d,1} < t_{d,2} < t_{d,3} < t_{d,4} < t_{d,5}$ during which no illumination is applied. The duration-intensity product of time windows $TW1_a$, $TW1_b$, $TW1_c$, $TW1_d$ is sufficiently high to ensure that the A state of the FP is almost completely depopulated over the duration $p \times t_c$. Sampling the decrease of the fluorescence signal during the first (or the firsts) time windows allow determining $k_A$, as discussed above. The non-illuminated time windows $TW2_a$, $TW2_b$, $TW2_c$, $TW2_d$, . . . allow partial repopulation of state A. At the end of window $TW2_j$ of duration $t_{d,j}$ the concentration of A is proportional to $(1 - e^{-k_T t_{d,j}})$. This concentration determines the fluorescence intensity at the beginning of the next illuminated window $TW1_{j+1}$. As the time intervals $t_{d,j}$ have increasing (or, more generally, varying) durations, the fluorescence intensity measurements at the beginning of the illuminated windows allow determining $k_T$. This is illustrated in FIG. 8B.

Whatever the measurement protocol, several approaches exist for processing the measured time evolutions of the fluorescence signals to extract the relaxation times used to identify the RSFs. Processing is complicated by the fact that some of the evolutions are not purely monoexponential, but is rather expressed by a linear combination of two or more exponentials. A suitable processing method is therefore required to extract a single characteristic time for each RSF and for each illuminating condition. Advantageously, the extracted characteristic times should be as disperse as possible in order to maximize the discriminating power of the inventive method.

In a first realization, a monoexponential fitting is applied to either the whole duration of the fluorescence signal or, if the deviation from an exponential decay or increase is too strong, to a monotonous part of the signal, limited to a time window acting as a kinetic filter. The time window and the number of sampling points of the fluorescence signal for each illumination condition are advantageously chosen in such a way as to maximize the $\tau_{max}/\tau_{min}$ wherein $\tau_{max}$ (respectively $\tau_{min}$) is the longest (respectively shortest) relaxation time extracted within the ones of the RSFs to be discriminated. In order to improve the signal-to-noise ratio, it may be advantageous to compute a moving average over successive experimental points before proceeding to monoexponential fitting.

In a second realization, a "spectrum" S(l) is generated. It is defined as $$S(l) = \frac{\int_0^{\beta 10^l} (I_F(t) - \langle I_F(t) \rangle)(f_l(t) - \langle f_l(t) \rangle) dt}{\int_0^{\beta 10^l} \left( e^{-\frac{t}{10^l}} - \left\langle e^{-\frac{t}{10^l}} \right\rangle \right)(f_l(t) - \langle f_l(t) \rangle) dt} \quad (7)$$

where l is the decimal logarithm of a relaxation time, $I_F(t)$ is the fluorescence signal, ⟨ ⟩ represents a time average between 0 and $\beta 10^l$, $f_l(t)$ is a function to be chosen and $\beta$ a parameter to be chosen. More precisely, $\beta$ is chosen in such a way that the spectrum S(l) of a mono-exponential $I_F(t)$ has a single extremum corresponding to the decimal logarithm of the relaxation time of this mono-exponential.

The spectra of relaxation times can be computed for different choices of the function $f_l(t)$. The fluorescence evolution $I_F(t)$ being in general a linear combination of exponential functions, the choice $f_l(t) = \exp(-t/10^l)$ is intuitive. The correlation with an exponential is known to produce spectra with broad peaks i.e. a rather bad time resolution but little sensitivity to the signal-to-noise ratio of the fluorescence signal. In the more general case in which $I_F(t)$ is a linear combination of $n_s - 1$ exponential functions, the spectrum has up to $n_s - 1$ extrema.

The relaxation time used for identifying the RSFs is the one which corresponds to the single extremum of the spectrum, or to the extremum associated with the largest absolute value of the spectrum.

Other possible approaches are described in [Istratov 1999].

An interesting feature of the inventive method is that the use of a spatially inhomogeneous illumination (e.g. using a Gaussian laser beam) allows determining the position of a RSF. Indeed, when the rate-limiting step is photochemical, the kinetic signature of RSFs depends on light intensities. If the light intensities are inhomogeneous, the spatial dependence of the distance defined in Eq.(5) can be used to localize an RSF in the focal plane, and the spatial variation of the kinetics of fluorescence photoswitching can be used to restrict the detection of an RSF close to the focal plane. Therefore, in addition to its very high discriminating power, the inventive method allows improving the spatial resolution of fluorescence microscopy.

Let us consider a homogeneous RSF solution illuminated at $\lambda_1$ and $\lambda_2$, according to type-I and type-II, by two coaxial Gaussian beams having a same Rayleigh range $z_R = 26.6$ μm.

The kinetics is supposed to be limited by a photochemical step described by a two-state model with concentrations which evolve following an exponential law with relaxation times $\tau_I$ (type-I illumination) and $\tau_{II}$ (type-II illumination). These relaxation times depend on the light intensity, and therefore on position—in particular on the axial coordinate z.

The fluorescence signal integrated over a slice of solution of thickness "e" is given by $$I_F^j(t) = Q \int_{-e/2}^{+e/2} C^j(t, z) I_1(z) dz \qquad (8)$$

where Q is the brightness at $\lambda_1$ (brightness at $\lambda_2$ is considered negligible), j=I, II and $C^j$ the concentration of the bright state expressed as a function of along-axis position z and time t under type-I illumination.

FIG. 9A shows that under type-I illumination, $$I_F^I(t = 0)$$

(dashed line) and $$I_F^I(t = \tau_I(z = 0))$$

(dotted line) both increase with thickness e, but their difference $$I_F^I(t = 0) - I_F^I(t = \tau_I(z = 0))$$

(solid line) saturates for $e \approx z_R$. This means that only molecules situated at less than one Rayleigh range on either side of the focal plane contribute to the difference signal.

FIG. 9B shows that, under type-II illumination, this saturation is directly observed on the $$I_F^{II}(t = \tau_{II}(z = 0))$$

signal.

FIG. 10 is a very simplified scheme of an apparatus for carrying out the invention. The apparatus comprises two controlled light sources LS1, LS2 (e.g. semiconductor lasers) respectively emitting light beams $LB_1$, $LB_2$ of variable intensities $I_1$, $I_2$ at predetermined wavelengths. An optical system OS directs the light beams $LB_1$, $LB_2$ onto sample S and collects the fluorescent emission of the sample, which is directed onto light detector LD (e.g. a photomultiplier or an imaging detector such as a camera). Optical system OS may be or comprise a wide-field microscope, a scanning microscope, a simple set of collimating or imaging lenses, etc. In some cases, it may be absent, the light beams $LB_1$, $LB_2$ directly impinging onto the sample and the light detector LD being simply disposed near the sample.

A data processing device DPD—typically a computer or a system of several computers, interconnected or not over a network, controls the light sources to create a plurality of illumination conditions and processes the fluorescence signals generated by the light detectors as described above.

It should be understood that a single light source may be used (e.g. when FPs are used) or, conversely, more than two light sources at respective wavelengths, or even a single polychromatic or tunable source.

FIG. 11A shows a fluorescence image of Dronpa-labeled Escherichia coli bacteria acquired using an imaging apparatus according to FIG. 10. FIG. 11B is a plot of the time-evolution of the fluorescence intensity of these bacteria upon continuous illumination of intensity $I_1$=2 ein.m$^{-2}$.s$^{-1}$ at $\lambda_1$=488 nm and square-wave illumination of intensity $I_2$=0.2 ein.m$^{-2}$.s$^{-1}$ at $\lambda_2$=405 nm; the fluorescence decay has been mono-exponentially fitted to extract a "low intensity" decay time constant $$\tau_{low}^I.$$

A similar acquisition has been performed upon continuous illumination of intensity $I_1$=50 ein.m$^{-2}$.s$^{-1}$ at $\lambda_1$=488 nm and square-wave illumination of intensity $I_2$=20 ein.m$^{-2}$.s$^{-1}$ at $\lambda_2$=405 nm; a mono-exponential fit has issued a "high intensity" decay time constant $$\tau_{low}^I.$$

FIG. 11C is a representation of the Dronpa-labeled Escherichia coli in the 2D space $$\left(I_1 = \log_{10}\tau_{low}^I, I_3 = \log_{10}\tau_{high}^I\right).$$

The invention has been described with reference to a limited number of embodiments, but others are possible.

For instance, the RSFs may not be proteins, but any other photochemically active chemical species.

Different wavelengths, illumination conditions and illumination sequences may be used, depending on the features of the photocycles of the RSFs to be discriminated.

Depending on the required performances, all the available discriminating dimensions may not need to be used. For instance, it is possible to measure and use for discrimination only two relaxation times in the case of the RSFP of FIGS. 3A/3B instead of four. The two measurements may correspond, for instance, to those of time windows TW1 and TW3 of FIGS. 4A and 4C. It is important, however, to ensure that before each measurement the RSFP is in the expected initial state (state A in this example). If necessary, this can be achieved through illumination at $\lambda_2$. Alternatively, it is possible to use the measurements of time windows TW1 and then TW4, noting that the final state of window TW1 corresponds to the required initial state of window TW4. If the four time windows TW1, TW2, TW3 and TW4 are used, they need not to be taken in this order, provided that it is ensured that before each measurement the RSFP is in the expected initial state. An alternative ordering is, for instance, TW3—TW2—TW1—TW4.

Conversely, more than four time windows, and respective illumination conditions, may be used, provided that the photochemical dynamics of the RSF is complex enough.

The photochemically active species detected using the invention need not necessarily be fluorescent, and the probed optical property whose evolution is measured needs not necessarily be fluorescent emission. For instance, it may be optical absorbance or Raman scattering.

FIGS. 2A and 2B illustrate a "geometric" approach for discriminating fluorophores, but other methods may be used—e.g. classifiers such as neural networks. If a distance is used, it must not necessarily be defined as in equation 5. If a threshold distance is used for discrimination, it must not necessarily be defined as in equations 6A-6C.

REFERENCES

[Valm 2017] A. Valm, S. Cohen, W. Legant, J. Melunis, U. Hershberg, E. Wait, A. Cohen, M. Davidson, E. Betzig, and J. Lippincott-Schwartz. Applying systems-level spectral imaging and analysis to reveal the organelle interactome. Nature, 546:162-167, 2017.

[Lakowicz 1992] J. R. Lakowicz, H. Szmacinski, K. Nowaczyk, K. W. Berndt, and M. L. Johnson. Fluorescence lifetime imaging. Anal. Biochem., 202:316-330, 1992.

[Marriott 2008] G. Marriott, S. Mao, T. Sakata, J. Ran, D. K. Jackson, C. Petchprayoon, T. J. Gomez, E. Warp, 0. Tulyathan, H. L. Aaron, E. Y. Isacoff, and Y. Yan. Optical lock-in detection imaging microscopy for contrast enhanced imaging in living cells. Proc. Natl. Acad. Sci. U.S.A., 105:17789-17794, 2008.

[Richards 2010] C. I. Richards, J.-C. Hsiang, and R. M. Dickson. Synchronously amplified fluorescence image recovery (SAFIRe). J. Phys. Chem. B, 114:660-665, 2010.

[Querard 2015] J. Querard, T.-Z. Markus, M.-A. Plamont, C. Gauron, P. Wang, A. Espagne, M. Volovitch, S. Vriz, V. Croquette, A. Gautier, T. Le Saux, and L. Jullien. Photoswitching kinetics and phase-sensitive detection add discriminative dimensions for selective fluorescence imaging. Angew. Chem. Int. Ed., 127:2671—2675, 2015.

[Querard 2017] J. Qu6rard, R. Zhang, Z. Kelemen, M.-A. Plamont, X. Xie, R. Chouket, I. Roemgens, Y. Korepina, S. Albright, E. Ipendey, M. Volovitch, H. L. Sladitschek, P. Neveu, L. Gissot, A. Gautier, J.-D. Faure, V. Croquette, T. Le Saux, and L. Jullien. Resonant out-of-phase fluorescence microscopy and remote imaging overcome spectral limitations. Nat. Comm., 8:969, 2017.

[Summers 1988] D. Summers and J.M.W. Scott Systems of first-order chemical reactions, Math!. Comput. Modelling, 10:901-909, 1988.

[Istratov 1999] A. A. Istratov and 0. F. Vyvenko. Exponential analysis in physical phenomena. Rev. Sci. Instrum., 70:1233-1257, 1999.

[Widengren 2010] J.Widengren. Fluorescence-based transient state monitoring for biomolecular spectroscopy and imaging. J. R. Soc. Interface, 7:1135-1144, 2010.

[Byrdin 2018] Martin Byrdin, Chenxi Duan, Dominique Bourgeois, and Klaus Brettel. A long-lived triplet state is theentrance gateway to oxidative photochemistry in green fluorescent proteins. Journal of the American Chemical Society, 140(8):2897-2905,2018.

The invention claimed is:

1. A method for detecting a photochemically active chemical species in a sample, comprising the steps of:

a) illuminating the sample(S), according to an illumination sequence, with light $(LB_1)$ of at least a first wavelength $(\lambda_1)$ suitable to be absorbed by the chemical species triggering a first reaction $(R_1)$ affecting at least one optical property of the chemical species and comprising at least one photochemically-activated step $(PAS_1)$ and one thermally-activated step $(TAS_1)$, wherein the illumination sequence is such that:

in at least a first time window (TW1, TW1') of the illumination sequence, a rate of the first reaction is limited by the photochemically-activated step; and in at least a second time window (TW3, TW2') of the illumination sequence, the rate of the first reaction is limited by the thermally-activated step;

b) measuring the evolution of the at least one optical property of the chemical species during the first and the second time windows;

c) determining, from said measuring, at least a first and a second time constants representing rate constants of the first reaction in the first and the second time windows, respectively; and d) using the determined at least the first and second time constants for detecting the chemical species.

2. The method according to claim 1 wherein:

step a) also comprises illuminating the sample with light $(LB_2)$ of at least a second wavelength $(\lambda_2)$ according to the illumination sequence, wherein light at the second wavelength is suitable to be absorbed either by the chemical species or by a product of the first reaction and to trigger a second reaction $(R_2)$ affecting at least one optical property of the chemical species and comprising at least one photochemically-activated step $(PAS_2)$ and one thermally-activated step $(TAS_2)$, wherein the illumination sequence is such that:

in at least a third time window (TW2) of the illumination sequence, a rate of the second reaction is limited by the photochemically-activated step; and in at least a fourth time window (TW4) of the illumination sequence, the rate of the second reaction is limited by the thermally-activated step;

step b) also comprises measuring the evolution of the optical property of the chemical species during the third and the fourth time windows;

step c) also comprises determining, from said measuring, at least a third and a fourth time constants representing the rate constants of the second reaction in the third and the fourth time windows, respectively; the third and fourth time constants being used in step d), together with the first and second time constants, for detecting the chemical species.

3. The method according to claim 1 wherein step b) comprises measuring fluorescence emission.

4. The method according to claim 3, wherein said photochemically active chemical species is chosen among a fluorescent protein and a reversibly photoswitchable fluorophore.

5. The method according to claim 4, wherein:

said or at least one said photochemically active chemical species is a reversibly photoswitchable fluorescent protein;

during at least a first time window (TW1) of the illumination sequence, a light intensity level at the first wavelength (L) is kept sufficiently low for the rate of the first reaction to be limited by the photochemically-activated step; and during at least a second time window (TW3) of the illumination sequence, the light intensity level at the first wavelength is kept sufficiently high for the rate of the first reaction to be limited by the thermally-activated step.

6. The method according to claim 2, wherein:

said or at least one said photochemically active chemical species is a reversibly photoswitchable fluorescent protein;

during at least a first time window (TW1) of the illumination sequence, a light intensity level at the first wavelength (I1) is kept sufficiently low for the rate of the first reaction to be limited by the photochemically-activated step; and during at least a second time window (TW3) of the illumination sequence, the light intensity level at the first wavelength is kept sufficiently high for the rate of the first reaction to be limited by the thermally-activated step, and during at least a third time window (TW2) of the illumination sequence, a light intensity level ($I_2$) at the second wavelength is kept sufficiently low for the rate of the second reaction to be limited by the photochemically-activated step; and during at least a fourth time window (TW4) of the illumination sequence, the light intensity level at the second wavelength is kept sufficiently high for the rate of the second reaction to be limited by the thermally-activated step.

7. The method according to claim 4, wherein:

said or at least one said photochemically active chemical species is a fluorescent protein; during at least one first time window (TW1') of the illumination sequence, a light intensity level ($I_1$) at the first wavelength is kept sufficiently high for photochemically converting the chemical species into a non-fluorescent form, resulting in a progressive decrease in fluorescence intensity;

during at least one second time window (TW2') of the illumination sequence, following the first time window, the light intensity level ($I_1$) at the first wavelength is kept sufficiently low for allowing thermal recovery of the fluorescent intensity.

8. The method according to claim 4 wherein:

said or at least one said photochemically active chemical species is a reversibly photoswitchable fluorescent protein;

during at least one first time window (TW1) of the illumination sequence, the sample is illuminated by a first series of light pulses ($LP1_1$-$LP1_5$) at the first wavelength, each pulse having a fluence sufficiently low for only a fraction of the chemical species to be converted through the photochemically-activated step of the first reaction, an interval ($t_d$) between two consecutive pulses being sufficiently long for allowing said fraction of the chemical species to be fully converted through the thermally-activated step of the first reaction, following said photochemically-activated step; and during at least one second time window (TW3) of the illumination sequence, the sample is illuminated by a second series of light pulses ($LP3_1$-$LP3_5$) at the first wavelength, at least the first pulse of the series having a fluence sufficiently high for fully converting the chemical species through the photochemically-activated step of the first reaction, an interval ($t_d$) between two consecutive pulses being sufficiently short for sampling a subsequent further conversion of the chemical species through the thermally-activated step of the first reaction.

9. The method according to claim 2, wherein:

said or at least one said photochemically active chemical species is a reversibly photoswitchable fluorescent protein;

during at least one first time window (TW1) of the illumination sequence, the sample is illuminated by a first series of light pulses (LP11-LP15) at the first wavelength, each pulse having a fluence sufficiently low for only a fraction of the chemical species to be converted through the photochemically-activated step of the first reaction, an interval ($t_d$) between two consecutive pulses being sufficiently long for allowing said fraction of the chemical species to be fully converted through the thermally-activated step of the first reaction, following said photochemically-activated step; and during at least one second time window (TW3) of the illumination sequence, the sample is illuminated by a second series of light pulses (LP31-LP35) at the first wavelength, at least the first pulse of the series having a fluence sufficiently high for fully converting the chemical species through the photochemically-activated step of the first reaction, an interval (ta) between two consecutive pulses being sufficiently short for sampling a subsequent further conversion of the chemical species through the thermally-activated step of the first reaction; and during at least the third time window (TW2) of the illumination sequence, the sample is illuminated by a third series of light pulses ($LP2_1$-$LP2_5$) at the second wavelength, each pulse having a fluence sufficiently low for only a fraction of the chemical species to be converted through the photochemically-activated step of the second reaction, an interval between two consecutive pulses being sufficiently long for allowing said fraction of the chemical species to be fully converted through the thermally-activated step of the second reaction, following said photochemically-activated step; and during at least the fourth time window (TW4) of the illumination sequence, the sample is illuminated by a fourth series of light pulses ($LP4_1$-$LP4_5$) at the second wavelength, at least the first pulse of the series having a fluence sufficiently high for fully converting the chemical species through the photochemically-activated step of the second reaction, an interval between two consecutive pulses being sufficiently short for sampling a subsequent further conversion of the chemical species through the thermally-activated step of the second reaction.

10. The method according to claim 4, wherein:

said or at least one said photochemically active chemical species is a fluorescent protein;

during a plurality of first time windows (TW1*a*-TW1*e*), the sample is illuminated at the first wavelength with a fluence sufficiently high for fully converting the chemical species through the photochemically-activated step of the first reaction;

during a plurality of second time windows (TW2*a*-TW2*e*), alternating with the first time windows, the sample is not illuminated at the first wavelength, the second time windows having varying durations suitable for sampling a subsequent further conversion of the chemical species through the thermally-activated step of the first reaction.

11. The method according to claim 8 wherein steps a) and b) are carried out by light scanning microscopy.

12. The method according to claim 1 wherein:

the sample is illuminated with a spatially inhomogeneous light intensity; and step d) comprises using the determined time constants representing reaction rate constants limited by photo- chemically-activated steps for localizing said or at least one said chemical species within the sample.

13. The method according to claim 1 wherein step d) comprises:

computing a plurality of multidimensional logarithmic distances between a vector formed by the time con- stants determined at step c) and each one of a plurality of predetermined vectors of time constants, each of said predetermined vectors representing a respective photo- chemically active chemical species; and detecting one of said photochemically active chemical species when the corresponding multidimensional logarithmic distance is lower than a threshold repre- sentative of measurement uncertainties.

14. The method according to claim 1 wherein step b) comprises separately measuring the evolution of said or each said optical property of the chemical species at a plurality of locations within the sample, step c) comprising determining said time constants for each one of said location and step d) comprising determining if said optical species is present at each one of said locations.

15. An apparatus for carrying out a method according to claim 1 comprising:

at least one controlled light source (LS1) configured for illuminating the sample with light (LB1) of at least a first wavelength ($\lambda_1$) suitable to be absorbed by the chemical species triggering a first reaction ($R_1$) affect- ing at least one optical property of the chemical species and comprising at least one photochemically-activated step ($PAS_1$) and one thermally-activated step ($TAS_1$) and according to a predetermined illumination sequence comprising at least a first time window and at least a second time window corresponding to different illumination conditions such that in at least the first time window (TW1, TW1') of the predetermined illumination sequence, a rate of the first reaction is limited by the photochemically- activated step; and in at least a second time window (TW3, TW2') of the predetermined illumination sequence, the rate of the first reaction is limited by the thermally-activated step;

a light detector (LD) configured for measuring the evo- lution of the at least one optical property of the sample during said at least a first time window and at least a second time window; and a data processing device (DPD) configured for determin- ing, from said measuring, at least a first and a second time constants representing rate constants of the first reaction in the first and the second time windows respectively, and for detecting a photochemically active chemical species within the sample as a function of the determined at least the first and the second time con- stants.

* * * * *